United States Patent [19]

Fantone

[11] Patent Number: 4,526,467
[45] Date of Patent: Jul. 2, 1985

[54] APPARATUS AND METHODS FOR TESTING LENS STRUCTURE

[75] Inventor: Stephen D. Fantone, Saugus, Mass.

[73] Assignee: Polaroid Corporation, Cambridge, Mass.

[21] Appl. No.: 399,749

[22] Filed: Jul. 19, 1982

[51] Int. Cl.³ .................................. G01B 9/00
[52] U.S. Cl. ........................... 356/124; 356/125
[58] Field of Search ............. 356/121, 122, 123, 124, 356/125, 127, 363; 350/96.18, 96.20

[56] References Cited

U.S. PATENT DOCUMENTS

| | | | |
|---|---|---|---|
| 4,033,696 | 7/1977 | Nohda | 356/127 |
| 4,053,231 | 10/1977 | Fletcher et al. | 356/363 |
| 4,183,618 | 1/1980 | Rush et al. | 350/96.18 |
| 4,283,139 | 8/1981 | Swope | 356/125 |

FOREIGN PATENT DOCUMENTS 32035  8/1972  Japan ................... 356/363

Primary Examiner—R. A. Rosenberger
Attorney, Agent, or Firm—Francis J. Caufield

[57] ABSTRACT

Apparatus and method for testing the optical throughput or efficiency of lens structures adapted to be used in pairs to make a connection between optical fibers by imaging one fiber end, serving as input, via the connector pair into the end of the other fiber end, serving as output. The apparatus comprises structure by which the output beam of a nominally perfect connector half is presented to a lens structure under test while a reflecting surface simulating a fiber end is positioned in the test structure under conditions of actual use. The simulating beam is focused by the test lens structure onto the reflecting surface after which it is reflected along a path travelling oppositely to its entering direction. Structure is provided for comparing the energy content of the beam emerging from the test structure with that presented to it whereby the optical efficiency of the lens structure is determined.

19 Claims, 7 Drawing Figures

APPARATUS AND METHODS FOR TESTING LENS STRUCTURE

BACKGROUND OF THE INVENTION

This invention in general relates to connectors for coupling optical fibers and more particularly to apparatus for testing the optical throughput or efficiency of beam-expansion type lens structures utilized in connecting optical fibers.

As is well-known, fiber optical links have the same basic elements found in electrical communications systems. A transmitter converts electrical signals into light signals which are transmitted through optical fibers to a receiver where light signals are converted back to electrical ones. In the link, connectors serve to assure that tight physical or optical contact is made and maintained between the optical fibers and the transmitting or receiving components of the system.

Although seemingly simple, making the connection between the components of a fiber optic link is extremely troublesome and very different from making an electrical connection which requires only a reliable physical contact between two conductors. For a proper connection between optical fibers, the ends of the fibers must be accurately aligned to assure that light leaves and enters them within a certain range of angles. If not, leakage occurs causing large signal losses which make an otherwise attractive communication link impractical.

To solve the connector problem with tolerable losses, those skilled in the art have developed a class of connectors referred to as expanded beam or imaging connectors which are of the sort described in, for example, U.S. Pat. Nos. 4,183,618 and 4,186,995 and in an article entitled "Connectors that stretch" appearing in October 1980 in *Optical Spectra*.

The essence of the expanded-beam type connector is to enlarge and collimate or roughly collimate the light beam which emerges from the input fiber or fibers which are accurately placed in one-half of the connector at or nearly at the focus of its lens. The other half of the connector, similar in design but which may in fact be scaled to be larger, then acts in reverse by taking the expanded input beam and focusing it into the output fiber end located at or nearly at the axial focus of the other connector half. In this manner the task of optical alignment becomes one of mechanically aligning relatively large beam cross-sections rather than small fiber ends as is done in strictly mechanical connectors.

With such connectors, however, the burden on optical performance and related mechanical geometry is great and must be verified in a reliable manner consistent with usage to assure high quality.

It is thus a primary object of the present invention to provide apparatus and methods by which the performance and mechanical integrity of expanded beam type connectors for use in coupling optical fibers can be accurately and reliably tested.

It is another object of the present invention to provide apparatus and methods by which the optical efficiency of expanded-beam type connectors can be tested in a manner consistent with their usage.

Other objects of the invention will in part be obvious and will in part appear hereinafter. The invention, accordingly comprises the apparatus possessing the construction, combination of elements and arrangement of parts exemplified in the following detailed disclosure and the methods attendant to the use of the apparatus.

SUMMARY OF THE INVENTION

This invention in general relates to connectors for coupling optical fibers and more particularly to apparatus and methods for testing the optical throughput or efficiency of beam-expansion type lens structures utilized in connecting optical fibers.

The lens structures which the apparatus and methods of the invention are particularly suited to test are of the type adapted to receive in one end thereof an optical fiber with the end thereof positioned at a predetermined location with respect to the focus of the lens structure and which include reference surfaces by which the mechanical axis of one such lens structure can be aligned with that of another to form a connector pair in which the first of the pair, serving as the input, operates to expand and collimate or nearly collimate a light beam upon emerging from the end of the fiber positioned therein and the other of the pair, serving as output, operates to receive the expanded, collimated light beam emerging from the input lens structure and focus it into the end of a fiber located in the output lens structure.

The apparatus of the invention comprises a reflecting surface having the same nominal geometry as the end of an optical fiber to be used with such lens structures.

Means are included for supporting a lens structure to be tested and for positioning the reflecting surface in the test lens structure at the nominal location an optical fiber end would occupy under actual use in a lens structure.

Also included are means for providing a collimated or nearly collimated beam of radiation of predetermined spectral content and diameter.

Means are provided for aligning the collimated beam of radiation to be concentric with and parallel to the mechanical axis of the test lens structure so that the beam of radiation appears to the test lens structure to originate from a nominally perfect mating lens structure whereby the beam of radiation enters the test lens structure and is more or less perfectly focused thereby onto the reflecting surface from which it reflects to emerge from the test lens structure as a beam of radiation travelling oppositely to the entering collimated beam of radiation.

Additionally included are means for intercepting the beam of radiation emerging from the test lens structure and comparing its energy content with that of the entering collimated beam of radiation whereby the optical efficiency of the test lens structure is determined.

In a preferred embodiment, the aligning means of the apparatus comprises an interferometer arranged to create a predetermined interference pattern when at least part of the test lens structure reference surfaces and the collimated source of radiation are perpendicular and means for mechanically manipulating the test lens structure to orient it with respect to the collimated beam of radiation to facilitate the formation of the predetermined interference pattern.

Methods associated with the use of the testing apparatus of the invention are also included.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

DETAILED DESCRIPTION

This invention relates to test apparatus and methods by which the optical throughput or efficiency of lens structures of the type which are used in pairs to couple the ends of optical fibers is determined. To understand the nature of the features of the test apparatus and its method of use, it will first be necessary to become familiar in some detail with the general type of lens structure whose performance is determined with the test apparatus of the invention. It should be noted, however, that the general type of lens structure to be described does not form part of the invention and is presented only for a better understanding its nature and operation.

Figure 1:
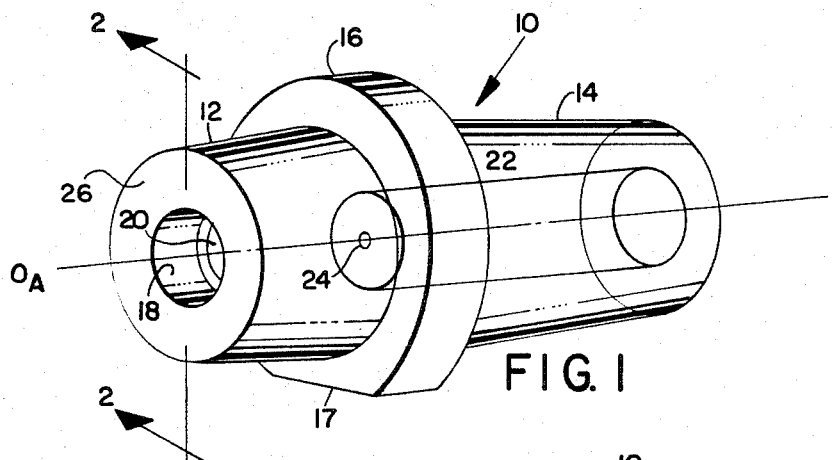
FIG. 1 is a diagrammatic perspective view of a well-known lens structure utilized to connect optical fibers.
Figure 2:
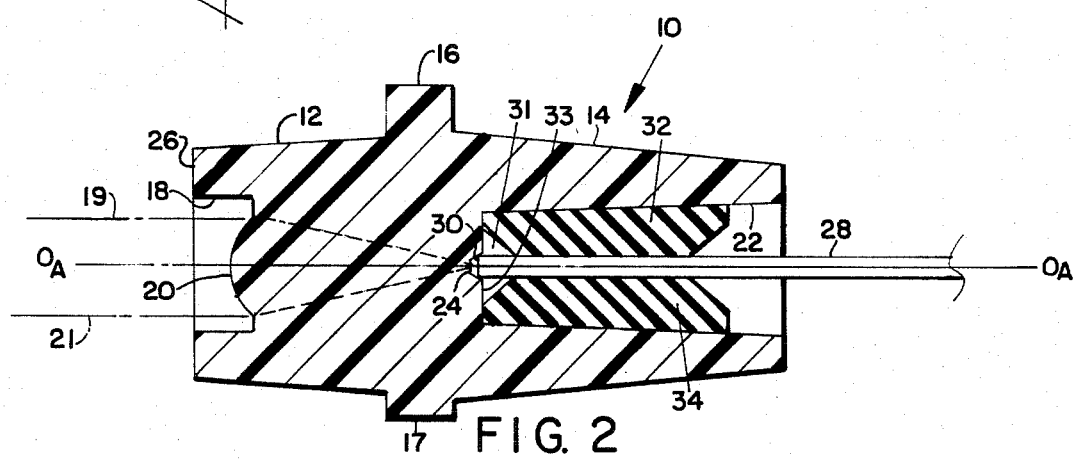
FIG. 2 is a slightly enlarged cross-sectional view of the lens structure of FIG. 1 taken generally along line 2—2 in FIG. 1 and shown in combination with an optical fiber and holder therefor.

The type of lens structures whose performance is determined by the apparatus of the invention is generally known as an optical imaging connector or a beam-expansion type connector. An example of such a lens structure, which in general includes many of the features contained in this class of lens structures, is shown in FIG. 1 at 10. The lens structure 10, as can be seen in FIGS. 1 and 2, is an integrally formed structure preferably molded of optical quality acrylic plastic. The lens structure 10 comprises a front tapered section 12 and a rear tapered section 14 which join together at a flange 16 having a flat 17 located in the circumferential edge of the flange 16. In the front section 12, there is a cylindrical hole 18 in the base of which there is located an aspheric lens surface 20. In the rear tapered section 14, there is a tapered hole 22 having a tapered indent 24 located at the center of its base 33. The taper of the hole 22 is shown in exaggerated fashion for clarity.

The tapered hole 22 is structured to receive three molded elastic fiber holders (only two shown) such as those designated at 32 and 34. The elastic fiber holders, 32 and 34, are injection molded from an elastomeric polymer and each has a triangular shaped cross section whose shape tapers and is especially configured so that, when three of the fiber holders are inserted into the tapered hole 22, they form between them, along the central axis of the hole 22, a small hole that tapers out at each end of the fiber holders 32 and 34. The size of this hole is by design made to be slightly too small to accept an optical fiber without stretching.

Between the tapered hole base 33 containing the tapered indent 24 and the forward ends of the fiber holders, e.g., 32 and 34, there is formed a small cavity 31. An epoxy having the same index of refraction or nearly so as that of the acrylic plastic from which the lens structure if formed is placed into this cavity 31 via the hole formed between the fiber holders, 32 and 34. Afterwards an optical fiber such as that designated at 28 is inserted into the hole formed by the fiber holders 32 and 34 until the end thereof designated at 30 seats in the taper of the indent 24. Since the hole formed by the fiber holders 32 and 34 is intentionally smaller than the outside diameter of the fiber 28, the walls of the fiber holders (32 and 34) are stretched by the optical fiber 28 and each exerts on the optical fiber 28 lateral restoring forces which are proportional to the amount of deformation experienced by the optical fiber holders 32 and 34. These forces balance against one another, since an elastomeric material under pressure behaves like a fluid, to center the optical fiber 28 along the optical axis, OA, of the lens structure 10. The longitudinal position of the optical fiber end 30 along the lens structure optical axis, OA, is determined by the fiberdiameter in combination with the tapered sides of the indent 24.

The dimensions of the tapered indent 24 are chosen so that when the optical fiber end 30 is positioned in the indent 24 the fiber end 30 is at the axial focus of the aspheric lens surface 20 whose shape is chosen to correct for spherical aberrations on axis. The presence of the epoxy, whose index matches that of the material from which the lens structure 10 is fabricated, in the cavity 31 reduces unwanted reflections at the optical fiber end 30, and any light travelling from the lens surface 20 to the optical fiber end 30 experiences no additional refraction in travelling toward the optical fiber end 30 since the index of refraction everywhere along its path of travel is uniform or nearly so. Thus, a pair of parallel rays, such as those designated at 19 and 21, impinging upon the aspheric surface 20 are focused thereby into the optical fiber end 30 as best shown in FIG. 2. Conversely, any light emerging from the optical fiber end 30 diverges after which it is collimated by the aspheric lens surface 20 and emerges therefrom as a parallel bundle. Another way of stating this is that the numerical aperture of a bundle of rays emerging from the optical fiber end 30 is reduced upon emerging from the aspheric lens surface 20.

Figure 3:
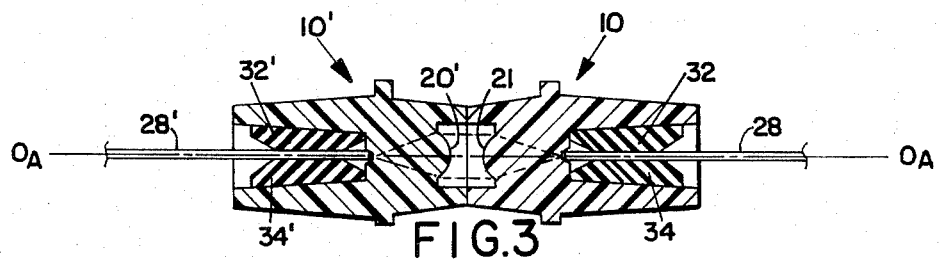
FIG. 3 is a cross-sectional view similar to that of FIG. 2, but with reduced scale, showing a pair of lens structures from FIG. 2 butted against one another to form a fiber optic connection.

Surrounding the lens structure front section hole 18 is an annular flat reference surface 26 that is nominally perpendicular to the optical axis, OA, of the lens structure 10. When a pair of lens structures of this type are butted together against their annular reference surfaces 26 with their aspheric lens surfaces 20 facing one another as shown in FIG. 3 where the lens structures are identified at 10 and 10', the beam of light emerging from one fiber end, serving as input gradually diverges as shown for example in the lens structure 10' after which it is collimated or nearly collimated by the aspheric lens surface 20' thereof and is then received by the other half of the connector pair and is focused into the end of the optical fiber located in that half of the connector. The axial alignment between the optical axes of such a pair of connectors may be accomplished in well-known manners by utilizing the exterior surfaces of the lens structure as axial alignment reference surfaces because of the general rotational symmetry of such structures.

Although other lens structures of this general type may have slightly different features than the one presently illustrated, all such lens structures operate in generally the same manner. That is, the output from one optical fiber end is collimated or nearly collimated by a lens surface thereof after which this beam is received by a mating connector or mating lens structure and is focused thereby into the end of another optical fiber end to complete the connection of the two optical fibers. Reference surfaces are included in each lens structure so they may be properly aligned both axially and perpendicular to one another.

These kind of lens structures have several advantages. The optical fibers are completely protected within the connection and any dust or scratches on the lens surfaces have far less of an effect on the large diameter beam than if they were on the fiber end surface. Additionally, the highly enlarged beam diameter makes the lateral tolerances for the interface between two connectors easy to maintain. Moreover the collimated nature of the beam gives enough separation between the connectors to allow the insertion of other optical elements in the intervening space. However, not all of the tolerances are loose in this kind of design. For example, the optical fibers must be positioned relative to the respective lenses just as accurately as if to another optical fiber. And, the permissible angular error between the connectors is actually tighter than for butting two fibers together. With proper design, however, the tighter tolerances are limited to the one time process of making the mold from which the lens structures are fabricated. This allows looser tolerances at the mechanical interfaces. In this connection, it is important that the mechanical axis which relates to the reference surface utilized to properly mate two lens structures together, and the optical axis be coincidental. Any differences between these two axes will, of course, result in degraded performance which can be measured by determining the optical efficiency of the lens structure, assuming that the mechanical geometry of the lens structure is nominally correct or nearly so.

Figure 4:
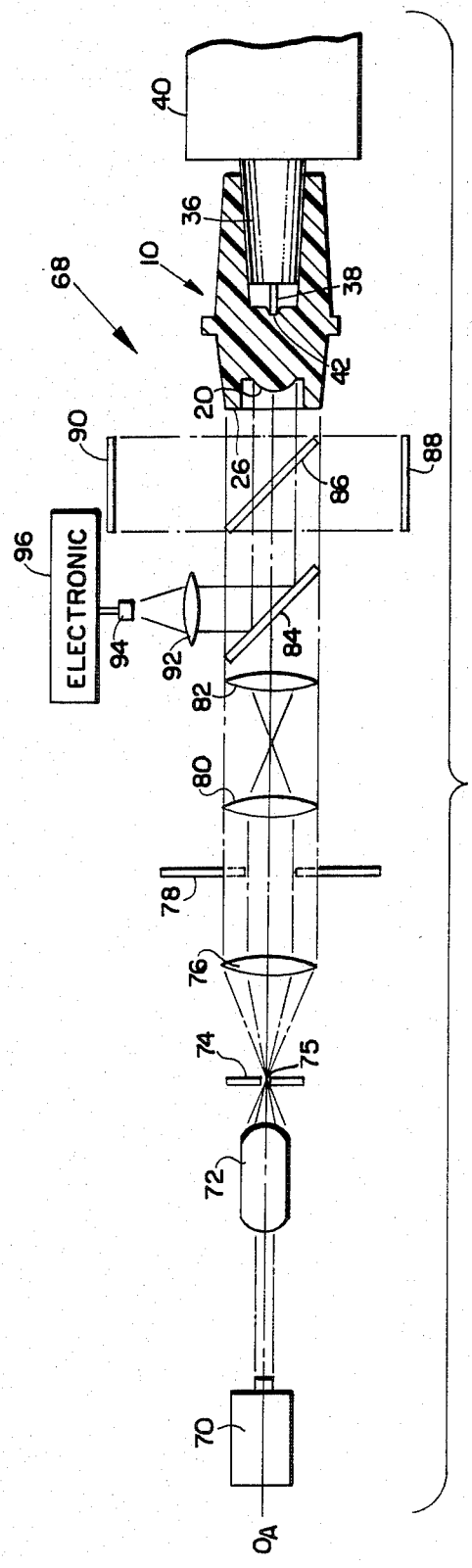
FIG. 4 is a diagrammatic plan view of part of the test apparatus of the invention shown in combination with the lens structure of FIG. 2 on a reduced scale.
Figure 5:
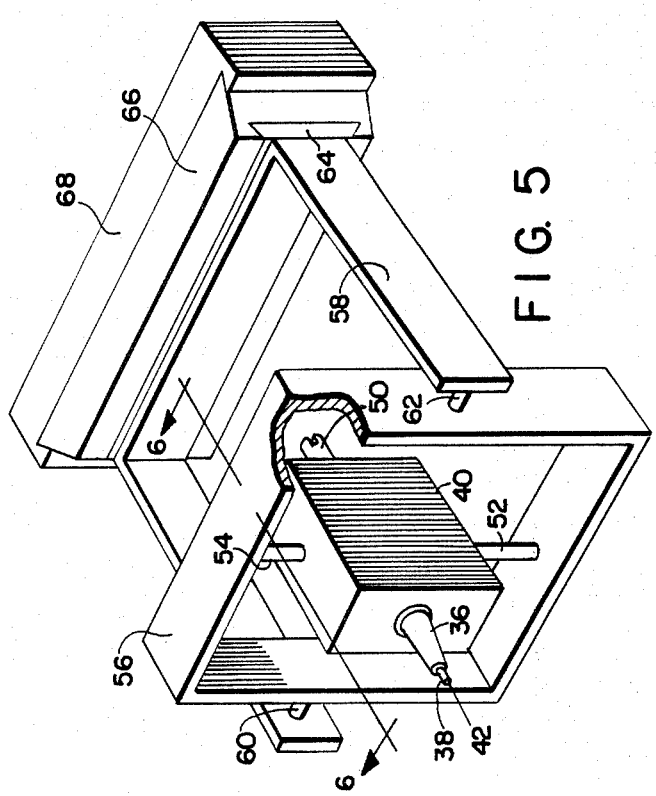
FIG. 5 is a diagrammatic perspective view of part of the test apparatus of the invention which partially appears broken away in FIG. 4.
Figure 6:
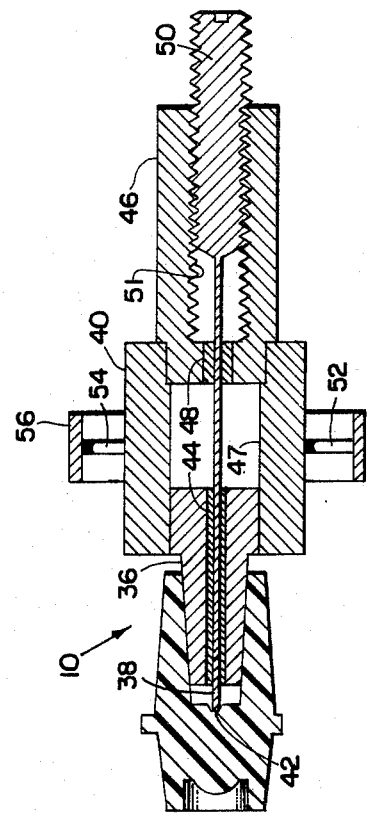
FIG. 6 is an enlarged cross-sectional view of part of the apparatus shown in FIG. 5 taken generally along line 6—6 of FIG. 5 shown in combination with the lens structure of FIG. 2 scaled down in size.

The apparatus of the invention by which the optical efficiency of such lens structures can be determined will best be understood by referring now to FIGS. 4, 5 and 6 wherein the test apparatus is generally shown at 68.

The test apparatus 68 comprises a laser 70 that is preferably selected so that the frequency of the laser beam generated by it focuses at the focal point of the lens structure's aspheric lens surface 20. The choice of laser frequency need not be exactly correct if one accounts for any differences in focal length arising because the laser frequency utilized is different than the frequency at which the lens structure 10 is to be used. In some cases, helium-neon laser will give satisfactory results. The laser beam emanating from the laser 70 is focused by a conventional microscope objective 72 onto a pinhole 75 that is located in a plate 74. Upon emerging from pinhole 75 the laser beam diverges until it impinges on a conventional collimating lens 76. The collimated laser beam upon emerging from the collimating lens 76 is enlarged in diameter and is in the form of a bunch of parallel rays which proceed along the optical axis of the system described thus far. The diameter of the collimated laser beam is controllable by a variable aperture 78 placed in the path of the collimated laser beam for reasons which will become more apparent hereinafter. Upon emerging from the variable aperture 78 the laser beam then enters relay optics comprising a pair of relay lenses 80 and 82 that are structured and arranged to image the aperture of the variable aperture 78 onto the aspheric lens surface 20 while at the same time controlling the collimation of the beam at the aspheric lens 20. The lens structure 10 is supported in a manner now to be described.

Referring now to FIGS. 5 and 6, there is shown a mechanical structural arrangement by which a test lens structure 10 is supported along its mechanical axis and allows the test lens structure 10 to be oriented in such a way that its mechanical axis can be aligned parallel to and centered with respect to the optical axis of the collimated laser beam. To accomplish this, the mechanical arrangement comprises a tapered mounting hub 36 which is dimensioned to fit into the tapered rear hole 22 of the lens structure 10 in such a way that the lens structure 10 which, as will be recalled is rotationally symmetric, is centered on its own mechanical axis. In this connection, the tapered mounting hub 36 may be vertically oriented along with the other components of the test apparatus 68 so that the lens structure 10 seats itself under its own weight, or alternatively, the lens structure 10 may be seated on the tapered mounting hub 36 through the use of predetermined spring loading. The tapered mounting hub 36 is pressed into a bore hole 47 that is located in a block 40. Located in the opposite end of the block bore hole 47 is a barrel 46 having a threaded hole 51 extending longitudinally therein to a predetermined depth. In the base of the threaded hole 51 there is located a sleeve 48 and through the center of the tapered mounting hub 36 there is another sleeve 44. Both the sleeve 44 and the sleeve 48 have precision holes extending longitudinally through them to accept a precision pin 38 that is attached to a precision threaded screw 50. The pin 38 is provided with a highly polished end 42 that is precisely perpendicular to its longitudinal axis and the position of the pin end 42 can be adjusted longitudinally through the use of the precision threaded screw 50. The diameter of the pin 38 is chosen to be the same as that of an optical fiber which would be used with the lens structure 10. The axial position of the pin end 42 is set to correspond to a location an optical fiber end would occupy under conditions of actual use of a lens structure 10.

The block 40 is mounted for rotation in a gimballed arrangement through the use of a pair of pivot pins, 52 and 54, which permits control of the azimuth angle of the lens structure 10 with respect to the laser beam. The pins 52 and 54 are mounted in a frame 56 which in turn is rotatably mounted via a pair of pivot pins 60 and 62 to a bracket 58. With this arrangement the elevation angle of the lens structure 10 with respect to the laser beam can also be controlled.

The frame 58 is mounted in a conventional x-y slider arrangement comprising a horizontal slide 64 having undercut edges which in turn can is slideably mounted in a vertical sliding block 66 also having undercut edges, both for precise control of the x and y coordinates of the lens structure 10. All of the adjustments required to manipulate the centering of the lens structure 10 with respect to the center of the laser beam and also its angular orientation with respect to the laser beam can be accomplished in a conventional way by manipulation of this mechanical arrangement. Preferably the intersection of the gimbal axis is placed as close as possible to the apex of the aspheric lens surface 20.

To assure that the reference surface 26 is perpendicular to the optical axis of the laser beam an interferometer arrangement is utilized and this arrangement comprises the beamsplitter 86, a mirror 88 and a viewing screen 90. The manner in which the interferometer arrangement is utilized can best be understood by referring to FIG. 4. When the test apparatus 68 is utilized to assure that the reference surface 26 is perpendicular to the optical axis of the laser beam, the variable diaphragm aperture 78 is enlarged so that the diameter of the laser beam matches the outside diameter of the annular reference surface 26. From the annular reference surface 26, a beam is reflected back to the beamsplitter 86 and along a path to the viewing screen 90. Simultaneously therewith, the laser beam is reflected from the beamsplitter towards the mirror 88 and then from the mirror 88 back through the beamsplitter 86 to the viewing screen 90 where an interference pattern is viewed using conventional optics (not shown). When the annular reference surface 26 is exactly perpendicular to the otical axis of the laser beam there will be no tilt fringes viewable at the viewing screen 90.

To test the optical efficiency of the lens structure 10, the variable aperture 78 is reduced in size so that the diameter of the laser beam imaged onto the aspheric lens surface 20 matches the diameter of a beam which would emerge from a connector under actual use. The laser beam then is focused by the aspheric lens surface 20 more or less perfectly onto the reflecting end 42 of the pin 38. The state of the focus of the laser beam onto the pin end 42 depends on the geometric and optical conformity of the lens structure 10 to its specification. The laser beam then reflects off the pin end 42 and is reflected back out through the aspheric lens surface 20 whereupon it is intercepted by another beamsplitter 84 and is directed thereby into a conventional lens system 92 which images the beam emerging from the aspheric lens surface 20 onto a photodetector 94. The output of the photodetector 94 serves as an input to a conventional electronic arrangement 96 that is structured to compare the energy content of the laser beam entering the test lens structure 10 with that of the energy content of the laser beam that is reflected from the pin end 42 back out through the system and collected by the lens 92 and focused onto the photodetector 94. In this manner the optical efficiency or throughput of lens structure 10 is immediately determined by the electronic arrangement 96. In this connection, all of the losses that occur as a result of the beamsplitters and mirrors in the system are automatically accounted for by appropriate adjustments to the electronic circuits contained in the electronics arrangement 96.

Thus by measuring the optical efficiency of the lens structure 10 under conditions which simulate its actual use, one can readily determine the performance of the lens structure 10, accounting automatically for any geometric or optical problems which may arise from a lack of conformity with its specification.

Figure 7:
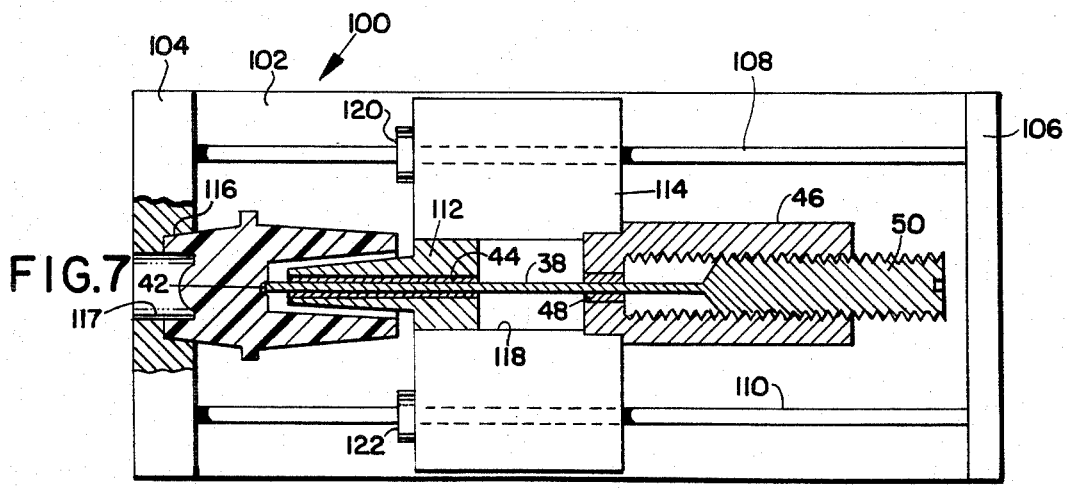
FIG. 7 is a plan view, partially in section, of an alternate embodiment for part of the apparatus of the invention shown in combination with the lens structure of FIG. 2 scaled down in size.

An alternate arrangement for mounting the lens structure 10 to be tested is shown in FIG. 7. In this arangement, as will be seen, the lens structure 10 is mounted through the use of a mechanical arrangement which simulates the mating surfaces of a nominally perfect lens structure, and this arrangement does not require the use of the interferometer and adjustment features of the previous test apparatus described.

As can be seen in FIG. 7, the alternate lens structure mounting arrangement is designated generally at 100 and comprises a base 102. Extending vertically from either end of the base are brackets including a front wall bracket 104 and a rear wall bracket 106. Located in the front wall bracket 104 is a through hole 117 which terminates in a counterbored section 116 which is dimensioned to precisely represent the mounting reference surfaces of the forward end of a lens structure 10. A test lens structure 10 may be seated in the counterbore hole 116 through the use of a conventional spring loading arrangement (not shown).

Slideably mounted on two rods, 108 and 110, which extend between the front and rear brackets, 104 and 106, is a block 114 having therein a bore hole 118. In the forward end of the bore hole 118, there is located a tapered hub 112 that is dimensioned so that it will not contact the interior surfaces of tapered hole 22 in the test lens structure 10. The tapered hub 112 has the sleeve 44 extending longitudinally through its center as in the previous arrangement. In the rear of the bore hole 118 there is located the barrel and screw adjustment which is of the same structure as that previously described with reference to the prior test aparatus. In this arrangement, the location of the pin end 42 is adjusted through the use of a pair of collars, 120 and 122, mounted on the rods, 108 and 110, respectively. The collars, 120 and 122, establish how far the block 114 can be slid to the left in FIG. 7. In combination with this collar stopping arrangement, the adjustment screw 50 may also be utilized to establish the precise location of the pin end 42.

The optical efficiency of the test lens structure 10 can, with this mounting arrangement, be measured in the same manner as previously described.

The methods inherent in the use of the test apparatus of the invention and its alternate mounting arrangement are within the scope of the invention and are particularly pointed out in the appended claims. It will be obvious to those skilled in the art that other changes may be made in the above described embodiments without departing from the scope of the invention. Therefore, it is intended that all matter contained in the above description or shown in the accompanying drawings shall be interpreted as illustrative and not in a limiting sense.

What is claimed is:

1. Apparatus for testing lens structures of the type that have a lens surface and are adapted to receive in one end thereof an optical fiber with the end thereof positoned at a predetermined location with respect to the focus of the lens surface and which include reference surfaces by which the mechanical axis of one such lens structure can be alinged with that of another to form a connector pair in which the first of the pair, serving as the input, operates to expand and collimate or nearly collimate a light beam upon emerging from the end of the fiber positioned therein and the other of the pair, serving as output, operates to receive the expanded, collimated light beam emerging from the input lens structure and focus it into the end of a fiber located in the output lens structure, said apparatus comprising:
a reflecting surface having the same nominal geometry as the end of an optical fiber to be used with such lens structures;
means for supporting a lens structure to be tested and for positioning said reflecting surface in the test lens structure at the nominal location an optical fiber end would occupy under actual use in a lens structure;

means for providing a collimated or nearly collimated beam of radiation of predetermined spectral content and having a diameter at least as least as large as that of the lens structure lens surface;

means for aligning said collimated beam of radiation to be concentric with and parallel to the mechanical axis of the test lens structure so that said beam of radiation covers the test lens structure lens surface and appears to the test lens structure to originate from a nominally perfect mating lens structure whereby said beam of radiation enters the test lens structure and is more or less perfectly focused thereby onto said reflecting surface from which it reflects to emerge from the test lens structure as a beam of radiation travelling oppositely to said entering collimated beam of radiation; and means for intercepting said beam of radiation emerging from the test lens structure and comparing its energy content with that of said entering collimated beam of radiation whereby the optical efficiency of the test lens structure is determined.

2. The apparatus of claim 1 wherein said aligning means comprises:

(a) an interferometer arranged to create a predetermined interference pattern when at least part of the test lens structure reference surfaces and said collimated source of radiation are perpendicular; and (b) means for mechanically manipulating the test lens structure to orient it with respect to said collimated beam of radiation to facilitate the formation of said predetermined interference pattern.

3. The apparatus of claim 2 wherein said mechanical manipulation means comprises a mechanical arrangement for independently translating the test lens structure in two linear directions perpendicular to its nominal mechanical axis to center the test lens structure with respect to said collimated beam of radiation and for rotating the test lens structure to independently adjust its azimuth and elevation angles with respect to said collimated beam of radiation so that said part of the test lens structure reference surfaces can be aligned perpendicular to said collimated beam of radiation.

4. The apparatus of claim 1 or 2 wherein said collimated beam of radiation comprises a beam from a laser.

5. The apparatus of claim 4 wherein said laser comprises a helium-neon laser.

6. Apparatus for testing lens structures of the type that have a lens surface and are adapted to receive in one end thereof an optical fiber with the end thereof positioned at a predetermined location with respect to the focus of the lens surface and which include a reference surface perpendicular to a longitudinal mechanical axis thereof so that, when two lens structures are butted together against their reference surfaces with their mechanical axes coaxially alinged, they form a fiber optic connector pair in which the first of the pair, serving as the input, operates to expand and collimate or nearly collimate the beam emerging from the end of the fiber positioned therein and the other of the pair, serving as output, operates to receive the expanded collimated beam emerging from the input lens structure and focus it into the end of a fiber positioned at a predetermined location in the output lens structure, said apparatus comprising:

a reflecting surface having the same nominal geometry as the end of an optical fiber to be used with such lens structures;

means for supporting a lens structure to be tested and for positioning said reflecting surface in the test lens structure at the nominal location an optical fiber end would occupy under actual use in a lens structure;

means for providing a collimated or nearly collimated beam of radiation of predetermined spectral content and having a diameter at least as large as that of the lens structure lens surface;

means for aligning said collimated beam of radiation to be perpendicular to the test lens structure reference surface and centered with respect to its mechanical axis so that said beam of radiation covers the test lens structure lens surface and appears to the test lens structure to originate from a nominally perfect mating lens structure whereby said beam of radiation enters the test lens structure and is more or less perfectly focused thereby onto said reflecting surface from which it reflects to emerge from the test lens structure as a beam of radiation travelling oppositely to said entering collimated beam of radiation; and means for intercepting said beam of radiation emerging from the test lens structure and comparing its energy content with that of said entering collimated beam of radiation whereby the optical efficiency of the test lens structure can be determined.

7. The apparatus of claim 6 wherein said aligning means comprises:

(a) an interferometer arranged to create a predetermined interference pattern when the test lens structure reference surface is perpendicular to said collimated beam of radiation; and (b) means for mechanically manipulating the test lens structure to orient it with respect to said collimated beam of radiation to facilitate the formation of said predetermined interference pattern.

8. The apparatus of claim 7 wherein said mechanical manipulation means comprises a mechanical arrangement for independently translating the test lens structure in two linear directions perpendicular to its nominal mechanical axis to center the test lens structure with respect to said collimated beam of radiation and for rotating the test lens structure to independently adjust its azimuth and elevation angles with respect to said collimated beam of radiation so that said test lens structure reference surface can be aligned perpendicular to said collimated beam of radiation.

9. The apparatus of claim 6 or 7 wherein said collimated beam of radiation comprises a beam from a laser.

10. The apparatus of claim 9 wherein said laser comprises a helium-neon laser.

11. Apparatus for testing a lens structure of the type that has a lens surface and is adapted to receive in one end thereof an optical fiber with the end thereof positioned at a predetermined position with respect to the focus of the lens surface and which includes reference surfaces for mating one lens structure to another to form a fiber optic connector pair in which the first of the pair, serving as the input, operates to expand and collimate or nearly collimate the beam emerging from the end of the fiber positioned therein and the other of the pair, serving as output, operates to receive the expanded collimated beam emerging from the input lens structure and focus it onto the end of a fiber positioned at a predetermined location in the output lens structure, said apparatus comprising:

means for simulating the mating surfaces of an optical lens structure having nominal geometry and for retaining a lens structure to be tested in mating relationship with said simulated mating surfaces;

a reflecting surface having the same nominal geometry as the end of a fiber to be used with such lens structures;

means for positioning said reflecting surface in the test lens structure at the nominal location a fiber end would occupy under actual use in such lens structures;

means for directing a collimated or nearly collimated beam of radiation having a predetermined spectral content and a diameter at least as latge as that of the lens structure lens surface at the lens surface of the test lens structure so that said beam appears to the test lens structure, when in mating relationship to said simulated mating surfaces, to originate from a nominally perfect lens structure whereby said beam enters said test lens structure and is focused thereby onto said relfective surface after which it is reflected emerging from said test lens structure as a beam travelling oppositely to the said entering beam; and means for intercepting said emerging beam and comparing its energy content with that of said entering collimated beam whereby the optical efficiency of the test lens structure can be determined.

12. A method for testing a lens structure of the type that has a lens surface and is adapted to receive in one end thereof an optical fiber with the end thereof positioned at a predetermined location with respect to the focus of the lens surface and which includes reference surfaces by which the mechanical axis of one such lens structure can be aligned with that of another to form a connector pair in which the first of the pair, serving as input, operates to expand and collimate or nearly collimate a light beam emerging from the end of the fiber positioned therein and the other of the pair, serving as output, operates to receive the expanded collimated beam emerging from the input lens structure and focus it into the end of a fiber located in the output lens structure, said method comprising the steps of:

supporting a lens structure to be tested and positioning a reflecting surface having the same nominal geometry as the end of an optical fiber to be used with such lens structures in the test lens structure at the nominal location an optical fiber would occupy under actual use in such lens structures;

aligning a collimated or nearly collimated beam of radiation having a predetermined spectral content and diameter at least as large as that of the lens structure lens surface concentric with and parallel to the mechanical axis of the test lens structure so that said beam of radiation covers the test lens structure lens surface and appears to the test lens structure to originate from a nominally perfect mating lens structure whereby said beam of radiation enters the test lens structure and is more or less perfectly focused thereby onto said reflecting surface from which it reflects to emerge from the test lens structure as a beam of radiation travelling oppositely to said entering collimated beam of radiation; and intercepting said beam of radiation emerging from the test lens structure and comparing its energy content with that of said entering collimated beam of radiation whereby the optical efficiency of the test lens structure can be determined.

13. The method of claim 12 wherein said aligning step comprises:
(a) arranging an interferometer to create a predetermined interference pattern when at least part of the test lens structure reference surfaces and said collimated beam of radiation are perpendicular; and
(b) manipulating the test lens structure to orient it with respect to said collimated beam of radiation to facilitate formation of said predetermined interference pattern.

14. The method of claim 13 wherein said manipulating step comprises independently translating the test lens structure in two linear directions perpendicular to its nominal mechanical axis to center the test lens structure with respect to said collimated beam of radiation and rotating the test lens structure to independently adjust its azimuth and elevation with respect to said collimated beam of radiation so that said part of the test lens structure reference surfaces can be aligned perpendicular to said collimated beam of radiation.

15. The apparatus of claim 14 wherein said collimated beam of radiation comprises a beam from a laser.

16. A method for testing lens structures of the type that have a lens surface and are adapted to receive in one end thereof an optical fiber with the end thereof positioned at a predetermined location with respect to the focus of the lens surface and which include a reference surface perpendicular to a longitudinal mechanical axis thereof so that, when two such lens structures are butted together against their respective reference surfaces with their mechanical axes coaxially aligned, they form a connector pair in which the first of the pair, serving as input, operates to expand and collimate or nearly collimate a light beam emerging from the end of the fiber positioned therein and the other of the pair, serving as output, operates to receive the expanded collimated beam emerging from the input lens structure and focus it into the end of a fiber located in the output lens structure, said method comprising the steps of:

supporting a lens structure to be tested and positioning a reflecting surface having the same nominal geometry as the end of an optical fiber to be used with such lens structures in the test lens structure at the nominal location an optical fiber would occupy under actual use in such lens structures;

aligning a collimated or nearly collimated beam of radiation having a predetermined spectral content and diameter at least as large as that of the test lens structure lens surface concentric with and perpendicular to the reference surface of the test lens structures so that said beam of radiation covers the test lens structure lens surface and appears to the test lens structure to originate from a nominally perfect mating lens structure whereby said beam of radiation enters the test lens structure and is more or less perfectly focused thereby onto said reflecting surface from which it reflects to emerge from the test lens structure as a beam of radiation travelling oppositely to said entering collimated beam of radiation; and intercepting said beam of radiation emerging from the test lens structure and comparing its energy content with that of said entering collimated beam of radiation whereby the optical efficiency of the test lens structure can be determined.

17. The method of claim 16 wherein said aligning step comprises:
(a) arranging an interferometer to create a predetermined interference pattern when the test lens structure reference surfaces and said collimated beam of radiation are perpendicular; and (b) manipulating the test lens structure to orient it with respect to said collimated beam of radiation to facilitate formation of said predetermined interference pattern.

18. The method claim 17 wherein said manipulating step comprises independently translating the test lens structure in two linear directions perpendicular to its nominal mechanical axis to center the test lens structure with respect to said collimated beam of radiation and rotating the test lens structure to independently adjust its azimuth and elevation angles with respect to said collimated beam of radiation so that the test lens structure reference surfaces can be aligned perpendicular to said collimated beam of radiation.

19. The apparatus of claim 18 wherein said collimated beam of radiation comprises a beam from a laser.

* * * * *